United States Patent [19]
Yip et al.

[11] Patent Number: 6,104,726
[45] Date of Patent: Aug. 15, 2000

[54] SIMULTANEOUS TRANSFER OF VOICE AND DATA INFORMATION USING MULTI-RATE VOCODER AND BIT CONTROL PROTOCOL

[75] Inventors: William Chunhung Yip, Scottsdale; Steven Peter Allen, Mesa; James Brian Piket, Gilbert, all of Ariz.

[73] Assignee: Motorola, Inc., Schaumburg, Ill.

[21] Appl. No.: 08/829,074

[22] Filed: Mar. 31, 1997

[51] Int. Cl.[7] .................................................. H04J 3/22
[52] U.S. Cl. ........................ 370/468; 370/477; 370/494
[58] Field of Search .................................. 370/465, 468, 370/470, 471, 473, 474, 477, 493, 494, 495, 522, 527, 528, 529

[56] References Cited

U.S. PATENT DOCUMENTS

| | | | |
|---|---|---|---|
| 4,644,529 | 2/1987 | Amstutz et al. | 370/422 |
| 4,864,566 | 9/1989 | Chauveau | 370/521 |
| 5,103,459 | 4/1992 | Gilhousen et al. | 370/209 |
| 5,463,616 | 10/1995 | Kruse et al. | 370/276 |
| 5,511,073 | 4/1996 | Padovani et al. | 370/471 |
| 5,535,204 | 7/1996 | Li | 370/495 |
| 5,751,718 | 5/1998 | Yip et al. | 370/468 |

*Primary Examiner*—Chi H. Pham
*Assistant Examiner*—Kwang B. Yao
*Attorney, Agent, or Firm*—Bradley J. Botsch

[57] ABSTRACT

A technique and method that efficiently and simultaneously transfers both voice and data information over a single communications link (11). The technique and method utilizes a multi-rate vocoder (12) for providing voice information at a plurality of different rates. Accordingly, the vocoder may be dynamically adjusted during transfer of information to meet channel bandwidth requirements. The technique and method also utilizes a bit-control protocol for inserting voice information within a stream of data information by the use of inserting flags having predetermined bitstreams. Accordingly, voice information is dynamically inserted into an existing bitstream of data information such that voice information is transferred only upon demand and when needed. This prevents the transfer of useless information, such as voice information when a speaker is silent and, thus, allows for very efficient utilization of system bandwidth.

13 Claims, 2 Drawing Sheets

SIMULTANEOUS TRANSFER OF VOICE AND DATA INFORMATION USING MULTI-RATE VOCODER AND BIT CONTROL PROTOCOL

CROSS REFERENCE TO RELATED APPLICATIONS

This application is related to commonly-owned, copending application having U.S. Ser. No. 08/603,974 and filing date of Feb. 20, 1996.

BACKGROUND OF THE INVENTION

This invention relates to simultaneous transfer of voice and data over the same communications link and, in particular, to the simultaneous transfer of voice and data over the same communications link using a multi-rate vocoder and a bit control protocol.

The telecommunications market is experiencing many changes as a result of the expansion of wireless communications and the introduction of high speed modems which have become cost effective for many commercial applications. In many applications, it is desirable to be able to transfer both voice and data information over a single communication line. Such may be the case where only one communication line exists.

One technique for simultaneously transferring both voice and data information over a single communications link is to alternately interleave the voice and data information, bit by bit. This approach, however, is inefficient because nearly half of the time the speaker is not talking and, thus, voice information is not present and does not need to be transmitted. Additionally, such a technique requires that the transfer of voice information be synchronous with transfer of data information so that both can be interleaved properly.

Accordingly, it would be desirable to provide a method and technique for efficiently accomplishing the simultaneous transfer of both voice and data information over a single communication line.

It would also be desirable to simultaneously transfer both voice and data information over a single communications by dynamically inserting, based upon demand, voice information within bits of data information.

BRIEF DESCRIPTION OF THE DRAWINGS

A more complete understanding of the present invention may be derived by referring to the detailed description and claims when considered in conjunction with the drawings, wherein like reference numbers refer to similar items throughout the drawings; and wherein

DESCRIPTION OF THE DRAWINGS

Figure 1:
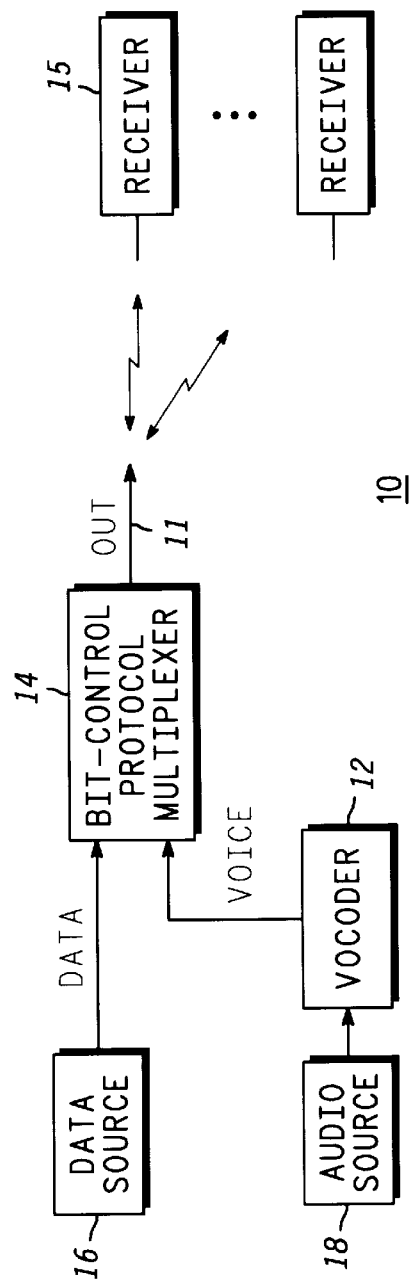
FIG. 1 is a block diagram illustrating the simultaneous transfer of both voice and data information over a single communications link using a multi-rate vocoder and a bit control protocol.

Referring to FIG. 1, a block diagram illustrating system 10 for simultaneously transferring both data and voice information over single communications link 11 by utilizing vocoder 12 and bit control protocol multiplexer 14. System 10 also includes data source 16 for providing data information to a first input of multiplexer 14. Data source 16 may take the form of any device for providing bits of data information such as a computer, a modem, a fax, a data network, multi-media conferencing, etc.

System 10 also includes audio source 18 for providing audio information to vocoder 12 the output of which provides voice information to the second input of multiplexer 14. Audio source 18 may take the form of any device for providing audio signals such as a telephone, two-way radio, cellular telephone, or any other audio source.

In a preferred embodiment, vocoder 12 may take the form of a multi-rate vocoder having the capability for providing voice information to the second input of multiplexer 14 at a plurality of different rates, for example, 9600 RELP (residual excited linear predictive coding), 4800 CELP (code excited linear predictive coding), and 2400 LPC (linear predictive coding). By utilizing a multi-rate vocoder, voice frames can be divided into strong voice frames, unvoiced frames and silent frames. For example, during strong voice frames, 9600 RELP vocoder frames will be sent, and during unvoiced frames 4800 CELP and 2400 LPC will be sent. During silence, no vocoder frame will be sent. This rate change of vocoder 12 can be dynamically adjusted during transfer to meet a channel bandwidth requirement of system 10, assuming that the channel has a larger bandwidth than the lowest vocoder rate.

The output of multiplexer 14 represents a single communications link (11) for transmitting both data and voice information to one or more receivers 15 associated with system 10 wherein receiver(s) 15 are electrically coupled to multiplexer 14, via communications link 11, for receiving the transmitted voice and data information.

Bit control protocol multiplexer 14 utilizes a bit control protocol such as a High-Level Data Link Control (HDLC) or a Synchronous Data Link Control (SDLC) protocol, for combining voice information from vocoder 12 with bits of data information from data source 16. The HDLC and SDLC protocols are described in detail in a book entitled, "Technical Aspects of DAMA Communication" by McNamara, Digital Equipment Corporation, 1978, the subject matter of which is incorporated by reference herein.

Figure 2:
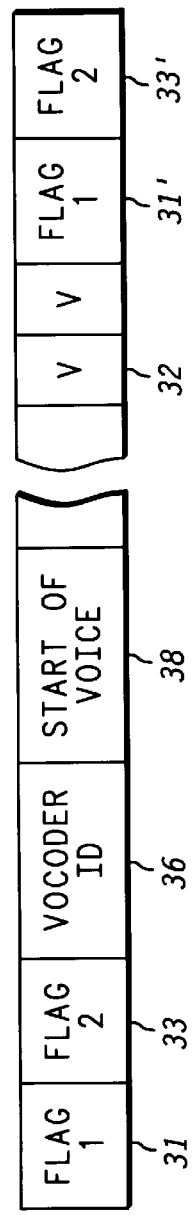
FIGS. 2 and 3 are pictorial diagrams illustrating an example of information blocks for inserting voice information into existing bitstream of data information.

Referring to FIG. 2, a pictorial diagram of information block 30 is shown for dynamically inserting voice information into an existing bitstream of data information to accomplish the simultaneous transfer of both voice and data information over a single communications link. Voice frames, such as frame 32, are inserted into an existing bitstream of data information at any time using a technique that involves the insertion of flags within an existing bit stream. The technique involves transmitting flags 31 and 33 (denoted by flag 1 and flag 2 of FIG. 2), comprising a predetermined sequence of bits, by system 10 to notice all receiver(s) 15 associated with system 10 that the existing bitstream of data information is being interrupted and that something special is coming, i.e., voice data. For example, flag 1 may include the bits of (01111111) and flag 2 may include the complement of the flag 1 bitstream, or the bits of (10000001). Accordingly, when it is desired to insert voice information into an existing bitstream of data information, a bitstream corresponding to a flag 1 and a flag 2 is inserted and transmitted into the bitstream of data information. In this manner, voice information is dynamically inserted anywhere into an existing bitstream of data information such that voice information is transferred only upon demand and when needed. This prevents the transfer of useless information, such as voice information when a speaker is silent and, thus, allows for very efficient utilization of system bandwidth. Bit control protocol further increases efficiency by minimizing bandwidth dedicated to protocol information and also increases flexibility by allowing voice information to be inserted anywhere in the bitstream thereby eliminating byte boundary restrictions.

In a preferred embodiment, vocoder ID bit sequence 36 follows Flag 1 and Flag 2 for identifying the vocoder rate. Vocoder bit sequence 36 also includes four hamming bits for error correction. Vocoder ID bit sequence 36 is shown in detail in FIG. 4 and more fully discussed hereinafter.

Following vocoder ID bit sequence 36, start of voice bit sequence 38 is transmitted for indicating the start of the inserted voice information as well as indicating that the following predetermined number of bits will be voice information, such as voice information generated by vocoder 12.

A predetermined number of voice information bits are then transmitted as represented by block 32.

After all of the voice bits have been transmitted, a bitstream comprising the bits corresponding to Flag 1 and Flag 2 (31' and 33') is again transmitted for identifying the end of the transmitted voice information.

Thereafter, system 10 may resume transfer of data information, such as bits of data information from data source 16

When transmitting voice frames, it is important to ensure that no flag bits occur within the bit stream of voice data so that the receiver will not falsely detect that data bits comprising a Flag 1 or Flag 2 has occurred. Therefore, referring to a preferred embodiment where the binary bitstream corresponding to a Flag 2 is (01111110), the Bit Control Protocol will automatically insert a binary zero if any succession of five continuos binary ones are detected. Accordingly, the receiver at the other end will remove the zero if it detects five continuous ones followed by a zero. Likewise, this techniques applies to the data bitstream to avoid incorrect flag identification. Using the above described insertion and removal of zeros, the occurrence of any Flag bits within the voice/vocoder data is abated.

Additionally, the presence of one flag without the other indicates a probable transmission error. However, mitigation techniques such as a "negative acknowledge" (NAK) and subsequent re-transmissions may be used to minimize the impact of such errors.

The above described flag insertion technique allows the insertion of voice information anywhere in an existing bitstream of data information and, thus, there is no need to keep synchronization between the transmitter and the receiver. Furthermore, such a technique allows different vocoder rates and frame sizes to be sent at any time.

Figure 3:
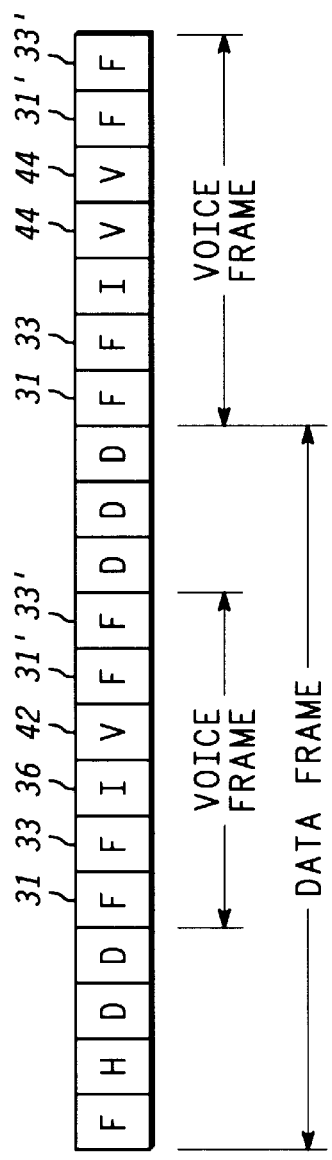

Referring now to FIG. 3, a pictorial diagram illustrating information block 40 is shown for dynamically inserting voice information into an existing bitstream of data information to accomplish the simultaneous transfer of both voice and data information over a single communications link. FIG. 3 is similar to FIG. 2 wherein FIG. 3 illustrates that voice information may be inserted in an existing bit stream or may be inserted as a stand alone packet thereby demonstrating that the voice bit stream may be of varying length depending on the Vocoder ID bit sequence. In particular, FIG. 3 illustrates voice data 42 being inserted into an existing bit stream of data information while voice data 44 is inserted as a stand alone packet.

Figure 4:
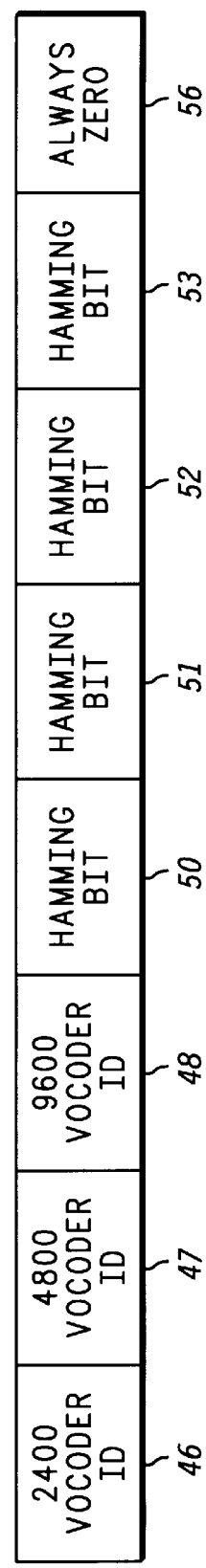
FIG. 4 is a pictorial diagram illustrating a description and layout of a vocoder identification byte associated with the information block of FIG. 2.

Referring to FIG. 4, the bits of vocoder identification byte 36 are shown in detail. The first three bits, 46–48, are the vocoder identification field bits for identifying the rate at which vocoder 12 is transmitting voice information wherein whichever identification bit is a logic "1", then the rate associated with that bit will be the transmit rate of vocoder 12. For example, if identification bit 46 is a logic "1", then vocoder 12 will transmit voice information at 2400 bits per second (bps). If identification bit 47 is a logic "1", then vocoder 12 will transmit voice information at 4800 bps. Finally, if identification bit 48 is a logic "1", then vocoder 12 will transmit at 9600 bps. Accordingly, if the vocoder identification field bits 46–48 are "100", then a receiver of system 10 will be informed to use the 2400 bps rate vocoder to decode.

Hamming bits 50–53 are included in vocoder identification byte 36 for providing a (7,3) hamming code for providing error correction.

Additionally, bit 56 of vocoder identification byte 36 will be set at a predetermined logic state, for example, logic "0", for providing additional error correction and protection. Bit 56 also helps a receiver to synchronize and recognize the vocoder identification byte.

By now it should be apparent that a novel technique and method has been provided for efficiently and simultaneously transferring both voice and data information over a single communications link. The technique and method utilizes a multi-rate vocoder for providing voice information at a plurality of different rates. Accordingly, the vocoder may be dynamically adjusted during transfer of information to meet channel bandwidth requirements. The technique and method also utilizes a bit-control protocol for inserting voice information within a stream of data information by the insertion of flags having predetermined bit patterns. Accordingly, voice information is dynamically inserted into an existing bitstream of data information such that voice information is transferred only upon demand and when needed. This prevents the transfer of useless information, such as voice information when a speaker is silent and, thus, allows for very efficient utilization of system bandwidth.

While the invention has been described in conjunction with a specific embodiments thereof, many alternatives, modifications and variations will be apparent to those of ordinary skill in the art in light of the foregoing description. Accordingly, the invention is intended to embrace all such alternatives, modifications and variations as fall within the broad scope of the appended claims.

What is claimed is:

1. A system for simultaneously transferring both voice and data information over a single communications link, comprising:

a data source for providing data information;

a vocoder for providing voice information;

a multiplexer, coupled to said data source and to said vocoder, for providing both said voice information and said data information over the single communications link by inserting said voice information into a bitstream of said data information, said multilexer utilizing a bit-control protocol having the capability of generating a predetermined sequence of bits for indicating that said bitstream of said data information is being interrupted; and a vocoder identification bit sequence for identifying one of said plurality of different data rates of said multi-rate vocoder.

2. The system according to claim 1 wherein said voice information is inserted into said bitstream of data information upon demand, via said predetermined sequence of bits, thereby allowing for efficient utilization of bandwidth of the system.

3. The system according to claim 1 further including an audio source for providing audio information to said vocoder.

4. The system of claim 1 wherein said vocoder is a multi-rate vocoder for providing voice information at a plurality of different data rates thereby dynamically adjusting a data rate of said vocoder to meet bandwidth requirements of the system.

5. The system of claim 1 wherein said vocoder identification bit sequence includes at least one bit for performing error correction.

6. The system of claim 1 wherein said predetermined sequence of bits comprises first and second flag sequences.

7. The system of claim 1 wherein said bit control protocol performs bit insertion and deletion thereby avoiding false detections of said predetermined sequence of bits.

8. A method for simultaneously transferring both voice information and data information over a single communications link, the method comprising the steps of:

generating a predetermined sequence of bits to interrupt a bitstream of data information;

inserting voice information into said bitstream of said data information;

providing said voice information at a plurality of different data rates thereby allowing for dynamic adjustment of the data rate of said inserted voice information; and using a multiplexer to generate a bit sequence for identifying one of said plurality of different data rates that said inserted voice information is provided.

9. The method according to claim 8 further including the step of generating a start of voice information byte for indicating a start of said inserted voice information.

10. The method of claim 8 further including the step of generating a predetermined logic bit when said predetermined sequence of bits is detected in said inserted voice information.

11. A system for simultaneously transferring both voice and data information over a single communications link, comprising:

means for generating a predetermined sequence of bits to interrupt an existing bitstream of data information;

means for inserting voice information into said bitstream of said data information;

means for providing said voice information at a plurality of different data rates thereby dynamically adjusting a data rate of said vocoder to meet bandwidth requirements of the system; and a multiplexer for generating a vocoder identification bit sequence for identifying one of said plurality of different data rates of said vocoder.

12. The system according to claim 11 further including means for generating a start of voice information bit sequence for indicating a start of said inserted voice information.

13. The system according to claim 11 further including means for generating a predetermined logic bit when said predetermined sequence of bits is detected within said inserted voice data.

* * * * *

UNITED STATES PATENT AND TRADEMARK OFFICE
CERTIFICATE OF CORRECTION

PATENT NO. : 6,104,726
DATED : August 15, 2000
INVENTOR(S) : William Chunhung Yip, Steven Peter Allen, James Brian Piket It is certified that error appears in the above-identified patent and that said Letters Patent is hereby corrected as shown below:

In claim 1, column 4, line 58, delete "multilexer" and replace with --multiplexer--.

Signed and Sealed this

First Day of May, 2001

Attest:

NICHOLAS P. GODICI

Attesting Officer     Acting Director of the United States Patent and Trademark Office